UNITED STATES PATENT OFFICE.

HENRY WILLIAM DE STUCKLÉ, OF PARIS, FRANCE.

PROCESS FOR PURIFYING LIQUIDS WHICH CONTAIN COLLOIDAL SILICIC ACID AS AN IMPURITY.

1,118,895.            Specification of Letters Patent.      Patented Nov. 24, 1914.

No Drawing.      Application filed February 18, 1914.   Serial No. 819,487.

*To all whom it may concern:*

Be it known that I, HENRY WILLIAM DE STUCKLÉ, a citizen of the United States of America, residing at Paris, France, have invented certain new and useful Improvements in Processes for Purifying Liquids which Contain Colloidal Silicic Acid as an Impurity, of which the following is a specification.

It is known to precipitate colloidal silicic acid from its water solutions by the addition of carbonate of sodium or potassium. Silicic acid is however not completely precipitated thereby, more particularly solutions which are very rich in silicic acid, cannot be purified in that manner, and in the presence of free mineral acid, carbonate of sodium does not act at all on colloidal silicic acid.

According to the present process, the separation of silicic acid from its solutions namely both from diluted and from concentrated silicic acid solutions as well as in the presence of free mineral acid is effected by adding to the said solutions a small quantity of silicofluoric, or hydrofluosilicic acid, $H_2SiF_6$, or one of its salts. In the cold, this addition produces precipitation of silicic acid after some time, while at the boiling heat, it is produced at once. This hydrofluosilicic acid can be produced in the silicic acid solution itself, by adding to the latter a little hydrofluoric acid or a fluorid and a free mineral acid. It is not necessary to use a quantity of fluorid equivalent to the silicic acid, a small percentage of the said quantity is sufficient.

This invention is valuable more particularly for the process in which minerals are treated with acid in order to extract metals or their salts soluble in the said acids. In such processes the silicic acid contained in the minerals is partly dissolved in the acid, whereby the latter is formed into a thick fluid so that the filtering required for separating the solution and gangue, becomes practically impossible. The presence of colloidal silicic acid is also liable to disturb the subsequent work whether owing to its choking the pores of the diaphragms when the solutions are treated electrolytically, or owing to its being precipitated with the metal salt to be extracted. All these drawbacks are avoided by precipitating the silicic acid according to the present process, and the metal salt solutions thus purified can be easily separated by filtration from the gangue. The clear solutions are suitable for the extraction of metals or their salts by electrolysis, cementation, chemical precipitation or crystallization.

What I claim is:—

1. A process for purifying solutions containing as an impurity colloidal silicic acid, which consists in subjecting the same to the action of a compound containing the hydrofluosilicic acid radical.

2. A process for purifying solutions containing as an impurity colloidal silicic acid, which consists in subjecting the same to the action of a suitable hydrofluosilicate.

3. A process for purifying solutions containing as an impurity colloidal silicic acid, which consists in producing therein a compound containing the hydrofluosilicic acid radical.

In testimony whereof I affix my signature in presence of two witnesses.

HENRY WILLIAM DE STUCKLÉ.

Witnesses:
     LUCIEN DUCHESNE,
     HANSON C. COXE.

Copies of this patent may be obtained for five cents each, by addressing the "Commissioner of Patents, Washington, D. C."